US011343287B2

(12) United States Patent
Lee

(10) Patent No.: US 11,343,287 B2
(45) Date of Patent: May 24, 2022

(54) ELECTRONIC DEVICE AND METHOD FOR MAINTAINING CALL FUNCTION IN ELECTRONIC DEVICE

(71) Applicant: Samsung Electronics Co., Ltd., Suwon-si (KR)

(72) Inventor: Shinduck Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/301,432

(22) Filed: Apr. 2, 2021

(65) Prior Publication Data

US 2021/0314369 A1    Oct. 7, 2021

(30) Foreign Application Priority Data

Apr. 2, 2020    (KR) .................... 10-2020-0040514

(51) Int. Cl.
*H04L 65/1016*    (2022.01)
*H04W 8/24*    (2009.01)
(Continued)

(52) U.S. Cl.
CPC ...... *H04L 65/1016* (2013.01); *H04L 65/1003* (2013.01); *H04L 65/1073* (2013.01); *H04W 8/24* (2013.01)

(58) Field of Classification Search
CPC ..... H04L 65/00; H04L 65/10; H04L 65/1003; H04L 65/1013; H04L 65/1016;
(Continued)

(56) References Cited

U.S. PATENT DOCUMENTS 9,219,759 B2 * 12/2015 Zisimopoulos ..... H04L 65/1016
9,775,125 B1 *  9/2017 Vashi .................. H04L 65/1073
(Continued)

FOREIGN PATENT DOCUMENTS

CN         110418384 A    11/2019
KR    10-2015-0086757 A     7/2015
(Continued)

OTHER PUBLICATIONS

Citizen Lab, "The Many Identifiers in Our Pockets", Unversity of Toronto (Year: 2015).*
(Continued)

*Primary Examiner* — Michael A Keller

(57) ABSTRACT

According to various embodiments, an electronic device may include at least one antenna module; and at least one processor configured to receive a communication service from a first communication network, a second communication network, and an IP multimedia subsystem (IMS) network via the at least one antenna module, wherein the at least one processor may be configured to: access the first communication network based on first identification information which corresponds to the first communication network, via the accessed first communication network, based on second identification information which corresponds to the IMS network, request the IMS network to register the electronic device, if registration request to the IMS network fails, access the second communication network, and request the IMS network to register the electronic device via the second communication network. Other various embodiments are possible.

22 Claims, 10 Drawing Sheets

(51) Int. Cl.
  *H04L 65/1073* (2022.01)
  *H04L 65/10* (2022.01)
(58) Field of Classification Search
  CPC ............. H04L 65/1066; H04L 65/1073; H04L 65/1059; H04W 8/00; H04W 8/22–245; H04W 8/24; H04W 88/06; H04W 48/18; H04M 3/5231; H04M 3/4283
  See application file for complete search history.

(56) References Cited

U.S. PATENT DOCUMENTS

| | | | |
|---|---|---|---|
| 2008/0244266 A1* | 10/2008 | Cai ..................... | H04L 9/3271 713/170 |
| 2010/0329243 A1* | 12/2010 | Buckley .............. | H04L 65/1069 370/352 |
| 2015/0208446 A1* | 7/2015 | Yeoum ................ | H04L 65/1073 370/329 |
| 2015/0282012 A1 | 10/2015 | Baek et al. | |
| 2018/0054767 A1* | 2/2018 | Gholmieh ........... | H04L 65/1069 |
| 2018/0132141 A1 | 5/2018 | Huang-Fu et al. | |
| 2018/0227960 A1 | 8/2018 | Belghoul et al. | |
| 2018/0368016 A1 | 12/2018 | Lee et al. | |
| 2019/0191349 A1 | 6/2019 | Kim et al. | |
| 2019/0313327 A1 | 10/2019 | Huang-Fu et al. | |
| 2020/0037281 A1* | 1/2020 | Lee ..................... | H04L 65/1016 |
| 2020/0153875 A1* | 5/2020 | Karampatsis ....... | H04L 65/1016 |
| 2020/0336937 A1* | 10/2020 | Youn .................... | H04W 76/18 |
| 2021/0021646 A1* | 1/2021 | Chiang ................ | H04W 76/12 |
| 2021/0029628 A1* | 1/2021 | Kim ..................... | H04W 76/19 |
| 2021/0037430 A1 | 2/2021 | Jin et al. | |
| 2021/0068018 A1* | 3/2021 | Kim ..................... | H04W 12/06 |
| 2021/0176817 A1* | 6/2021 | Takakura ............. | H04W 48/18 |
| 2021/0195471 A1* | 6/2021 | Aramoto .............. | H04W 60/00 |

FOREIGN PATENT DOCUMENTS

| | | |
|---|---|---|
| KR | 10-2015-0111236 A | 10/2015 |
| WO | 2019071377 A1 | 4/2019 |

OTHER PUBLICATIONS

International Search Report and Written Opinion of the International Searching Authority in connection with International Application No. PCT/KR2021/004003 dated Jul. 5, 2021, 7 pages.

* cited by examiner

ELECTRONIC DEVICE AND METHOD FOR MAINTAINING CALL FUNCTION IN ELECTRONIC DEVICE

CROSS-REFERENCE TO RELATED APPLICATION

This application is based on and claims priority under 35 U.S.C. § 119 to Korean Patent Application No. 10-2020-0040514, filed on Apr. 2, 2020, in the Korean Intellectual Property Office, the disclosure of which is incorporated by reference herein in its entirety.

BACKGROUND

1. Field

Various embodiments of the present disclosure relate to an electronic device and a method to maintain a call function in the electronic device.

2. Description of Related Art

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network communication system' or a 'post long-term evolution (LTE) system'.

It is considered that the 5G communication system may be implemented in millimeter wave (mmWave) bands (e.g., 60 to 60 GHz bands), so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beamforming technique, and a large scale antenna technique are discussed in 5G communication systems.

With development of a wireless communication system, the wireless communication system may provide an electronic device with an internet protocol (IP)-based multimedia service (e.g., voice, image, and data). For example, the electronic device may receive voice, image, or other media services via an IP multimedia subsystem (IMS) network. In order to provide the electronic device with a high-quality IP-based multimedia service, the wireless communication system may control quality of a multimedia service by using various service quality indicators (e.g., delay or throughput). For example, the wireless communication system provides a standard (e.g., a bearer or a real-time transport protocol (RTP)) for improving IP-based call quality.

According to a 5G communication technology, if a 5G communication network does not support an IMS voice call (VoLTE), an electronic device may call back to a 4G LTE communication network and use the IMS voice call. If the electronic device attempts a call in a 5G communication environment which does not support the IMS voice call, the electronic device performs a callback operation from the 5G communication network to the 4G LTE communication network, so an IMS call connection procedure for the call is executed. At this time, a delay may occur in relation to the IMS call connection operation, and the 4G LTE communication network which does not receive a signal within designated time due to the delay may treat the IMS call connection procedure as a call connection failure.

For example, if the electronic device attempts the call in the 5G communication network, the electronic device may call back to the 4G LTE communication network and then execute the IMS call connection procedure. However, a communication delay may occur during the IMS call connection operation after the callback. In this case, the delay may be treated as the call connection failure in the 4G LTE communication network, so a case may occur that a voice call may not be stably used in the 5G communication network.

SUMMARY

According to various embodiments of the present disclosure may provide an electronic device and a method to maintain a call function in the electronic device in which the electronic device calls back to a 4G LTE communication network and uses an IP multimedia subsystem (IMS) voice call service even though a 5G communication network does not support the IMS voice call service (VoLTE) when a voice call function is used in the electronic device, thereby the electronic device may use the voice call function without delay.

According to various embodiments of the present disclosure, an electronic device may include at least one antenna module; and at least one processor configured to receive a communication service from a first communication network, a second communication network, and an IP multimedia subsystem (IMS) network via the at least one antenna module, wherein the at least one processor may be configured to: access the first communication network based on first identification information which corresponds to the first communication network, via the accessed first communication network, based on second identification information which corresponds to the IMS network, request the IMS network to register the electronic device, if registration request to the IMS network fails, access the second communication network, and request the IMS network to register the electronic device via the second communication network.

According to various embodiments of the present disclosure, a method to maintain a call function in an electronic device may include accessing a first communication network based on first identification information which corresponds to the first communication network; via the accessed first communication network, based on second identification information which corresponds to an IP multimedia subsystem (IMS) network, requesting the IMS network to register the electronic device; if registration request to the IMS network fails, accessing a second communication network; and requesting the IMS network to register the electronic device via the second communication network.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

DETAILED DESCRIPTION

Figure 1:
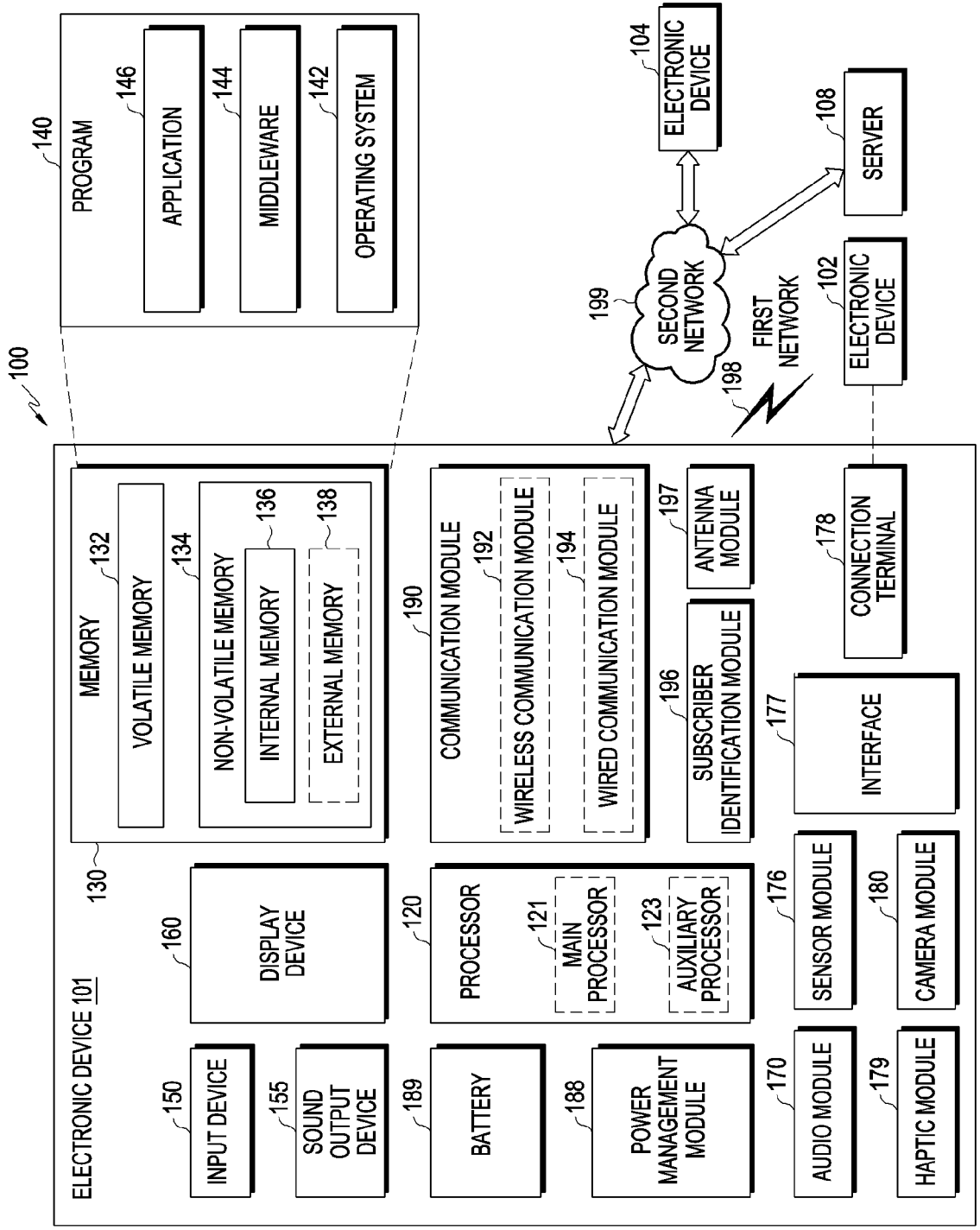
FIG. 1 is a block diagram illustrating an electronic device in a network environment according to various embodiments of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the present disclosure will be described in detail in conjunction with the accompanying drawings. In the following description of the present disclosure, a detailed description of known functions or configurations incorporated herein will be omitted when it may make the subject matter of the present disclosure rather unclear. The terms which will be described below are terms defined in consideration of the functions in the disclosure, and may be different according to users, intentions of the users, or customs. Therefore, the definitions of the terms should be made based on the contents throughout the specification.

It should be noted that the technical terms used herein are only used to describe specific embodiments, and are not intended to limit the present disclosure. Further, unless defined otherwise, the technical terms used herein should be interpreted to have the same meaning as those commonly understood by a person skilled in the art to which the present disclosure pertains, and should not be interpreted have excessively comprehensive or excessively restricted meanings unless defined otherwise. Further, when the technical terms used herein are wrong technical terms that cannot correctly represent the idea of the present disclosure, it should be appreciated that they are replaced by technical terms correctly understood by those skilled in the art. Further, the general terms used herein should be interpreted as defined in dictionaries or interpreted in the context of the relevant part, and should not be interpreted to have excessively restricted meanings.

In addition, a singular expression used herein may include a plural expression unless they are definitely different in the context. As used herein, the expression "comprises", "include", and/or the like should not be interpreted to necessarily include all components or all steps described in the specification, and should be interpreted to be allowed to exclude some of them or further include additional components or steps.

The terms including an ordinal number used in the specification, such as expressions "a first" and "a second" may be used to describe various components, but the corresponding components should not be limited by such terms. These terms are used merely to distinguish between one component and any other component. For example, a first component may be termed a second component, and similarly, a second component may be termed a first component without departing from the scope of the present disclosure.

It should be understood that when a component is referred to as being "connected" or "coupled" to another component, it may be connected or coupled directly to the other component, or any other component may be interposer between them. In contrast, it should be understood that when a component is referred to as being "directly connected" or "directly coupled" to another component, there are no component interposed between them.

Hereinafter, exemplary embodiments of the present disclosure will be described in detail with reference to the accompanying drawings. Regardless of drawing signs, the same or like components are provided with the same reference numeral, and a repeated description thereof will be omitted. In describing the present disclosure, descriptions related to technical contents well-known in the art and not associated directly with the present disclosure will be omitted. Further, it should be noted that the accompanying drawings are presented merely to help easy understanding of the present disclosure, and are not intended to limit the present disclosure. The technical idea of the present disclosure should be construed to cover all changes, equivalents, and alternatives, in addition to the drawings.

In the following, a mobile station will be described in the drawings, but the mobile station may be called an electronic device, a terminal, a mobile equipment (ME), a user equipment (UE), a user terminal (UT), a subscriber station (SS), a wireless device, a handheld device, an access terminal (AT). Further, the mobile station may be a device having a communication function, such as a mobile phone, a personal digital assistant (PDA), a smartphone, a wireless modem, and/or a notebook.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly.

According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
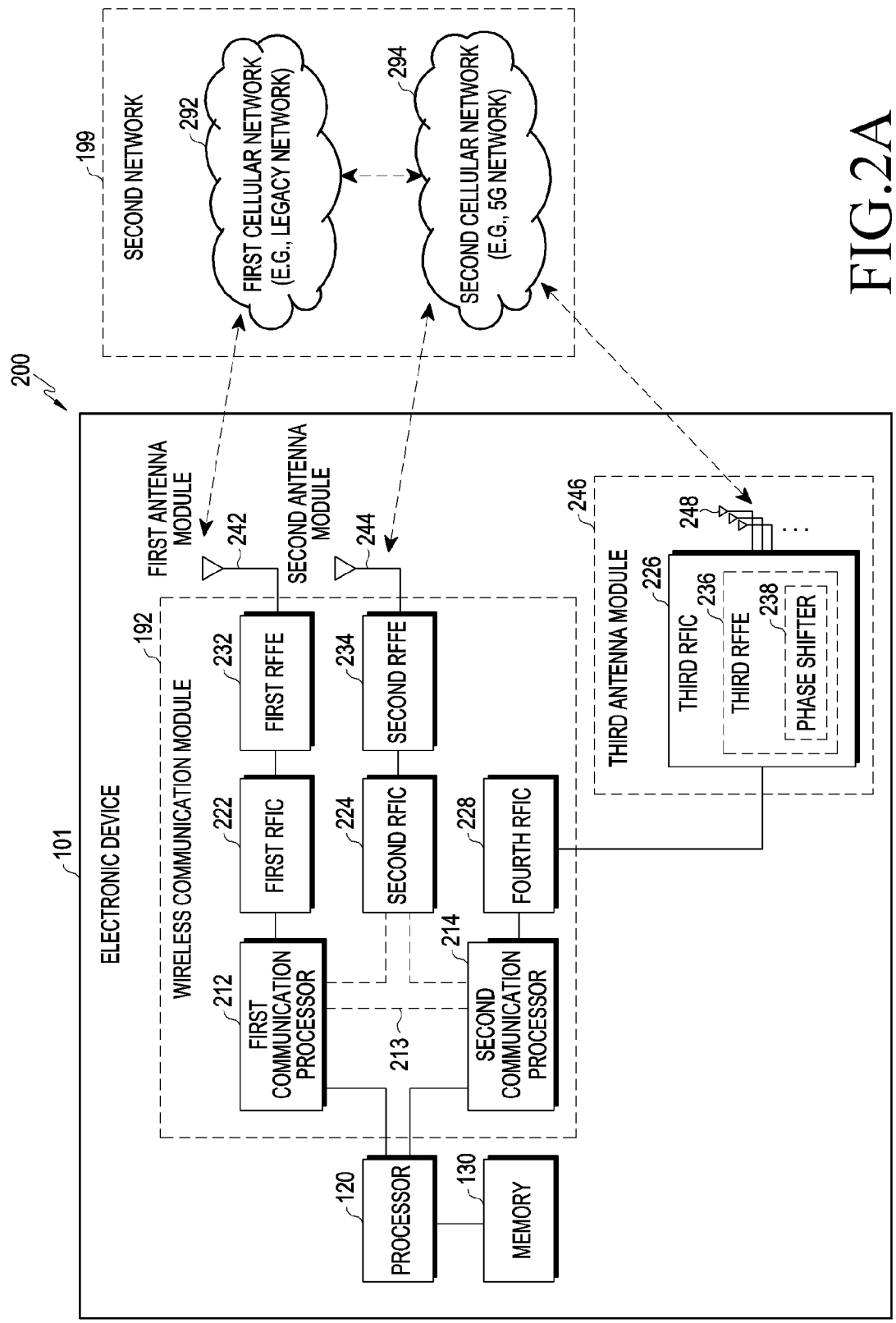
FIG. 2A is a block diagram illustrating an electronic device for supporting a legacy network communication and a 5G network communication according to various embodiments of the present disclosure.
Figure 2B:
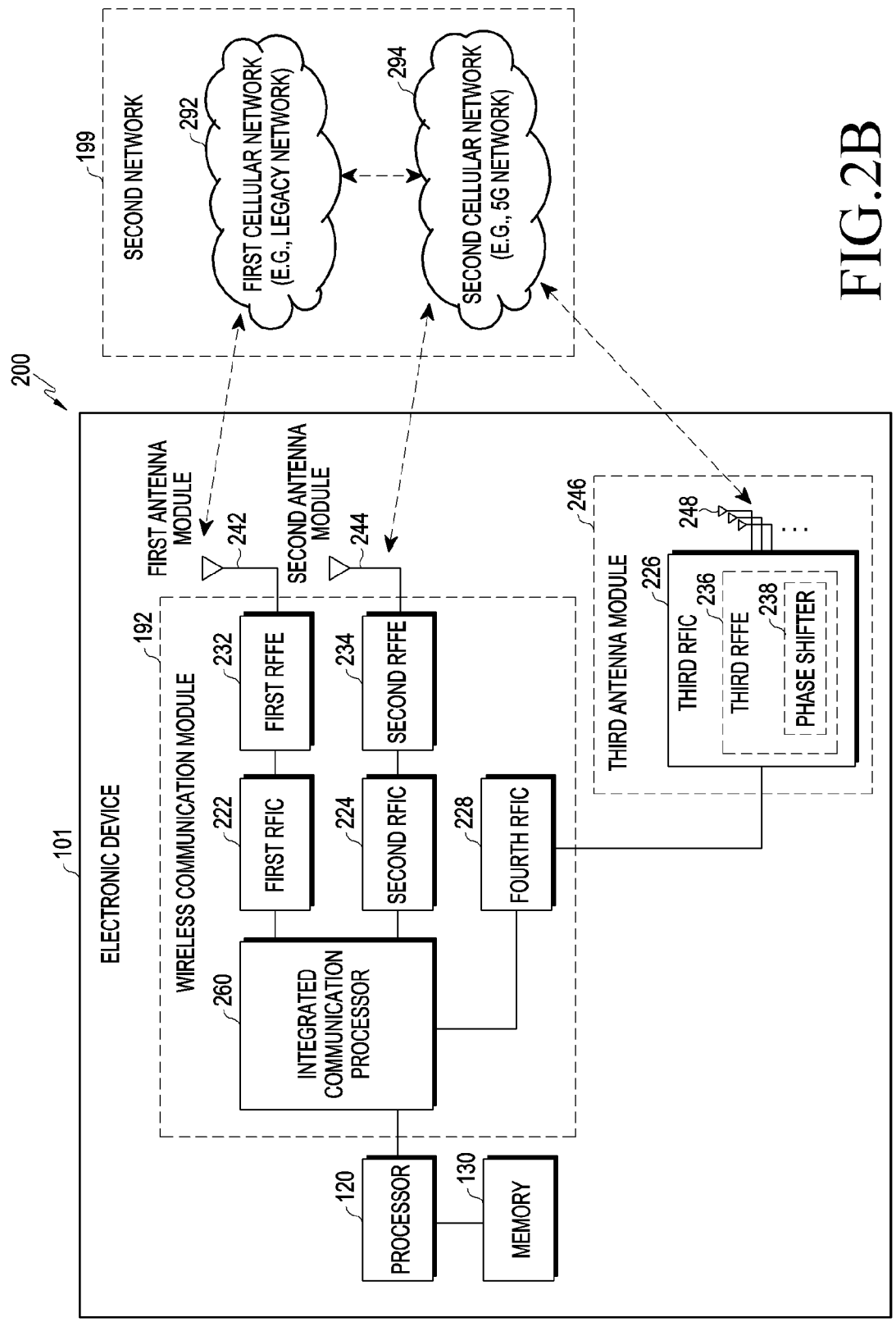
FIG. 2B is a block diagram illustrating an electronic device for supporting a legacy network communication and a 5G network communication according to various embodiments of the present disclosure.

FIG. 2A is a block diagram 200a illustrating an electronic device 101 for supporting a legacy network communication and a $5^{th}$ generation (5G) network communication according to various embodiments of the present disclosure. FIG. 2B is a block diagram 200b illustrating an electronic device 101 for supporting a legacy network communication and a 5G network communication according to various embodiments of the present disclosure. Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. A second network 199 may include a first cellular network 292 and a second cellular network 294. According to another embodiment, the electronic device 101 may further include at least one of the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of a wireless communication module 192. According to another embodiment, the fourth RFIC 228 may be omitted or included as part of the third RFIC 226.

The first communication processor 212 may establish a communication channel in a band to be used for a wireless communication with the first cellular network 292 and support a legacy network communication via the established communication channel. According to various embodiments of the present disclosure, the first cellular network 292 may be a legacy network including a $2^{nd}$ generation (2G), $3^{rd}$ generation (3G), $4^{th}$ generation (4G), or LTE network. The second communication processor 214 may establish a communication channel corresponding to a specified band (e.g., about 6 GHz to about 60 GHz) out of a band to be used for a wireless communication with the second cellular network 294 and support a 5G network communication via the established communication channel. According to various embodiments of the present disclosure, the second cellular network 294 may be a 5G network defined by the 3GPP. Additionally, according to an embodiment, the first communication processor 212 or the second communication processor 214 may establish a communication channel corresponding to another specified band (e.g., about 6 GHz or less) out of the band to be used for the wireless communication with the second cellular network 294 and support a 5G network communication via the established communication channel.

The first communication processor 212 may transmit and receive data to and from the second communication processor 214. For example, data supposed to be transmitted via a second cellular network 294 may be scheduled to be transmitted via a first cellular network 292. In this case, the first communication processor 212 may receive transmission data from the second communication processor 214. For example, the first communication processor 212 may transmit and receive data to and from the second communication processor 214 via an inter-processor interface 213. The inter-processor interface 213 may be implemented as, for example, a universal asynchronous receiver/transmitter (UART) (e.g., high speed-UART (HS-UART)) or a peripheral component interconnect bus express (PCIe) interface, but a type thereof is not limited. Alternatively, the first communication processor 212 and the second communication processor 214 may exchange control information and packet data information by using, for example, a shared memory. The first communication processor 212 may transmit and receive various pieces of information such as sensing information, information about output strength, and resource block (RB) allocation information to and from the second communication processor 214.

Depending on their implementation, the first communication processor 212 may not be coupled directly to the second communication processor 214. In this case, the first communication processor 212 may transmit and receive data to and from the second communication processor 214 via the processor 120 (e.g., an application processor). For example, the first communication processor 212 and the second communication processor 214 may transmit and receive data to and from the processor 120 (e.g., an application processor) via an HS-UART interface or a PCIe interface, but a type of an interface is not limited. Alternatively, the first communication processor 212 and the second communication processor 214 may exchange control information and packet data information by using, for example, the processor 120 (e.g., the application processor) and the shared memory.

According to an embodiment, the first communication processor 212 and the second communication processor 214 may be incorporated in a single chip or a single package. According to various embodiments of the present disclosure, the first communication processor 212 or the second communication processor 214 may be incorporated together with the processor 120, an auxiliary processor 123, or a communication module 190 in a single chip or a single package. For example, as illustrated in FIG. 2B, an integrated communication processor 260 may support all of functions for a communication with the first cellular network 292 and the second cellular network 294.

For transmission, the first RFIC 222 may convert a baseband signal generated by the first communication processor 212 to a radio frequency (RF) signal in about 700 MHz to about 3 GHz used in the first cellular network 292 (e.g., the legacy network). For reception, an RF signal may be obtained from the first network 292 (e.g., the legacy network) via an antenna (e.g., the first antenna module 242) and pre-processed via an RFFE (e.g., the first RFFE 232). The first RFIC 222 may convert the pre-processed RF signal to a baseband signal so that the baseband signal may be processed by the first communication processor 212.

For transmission, the second RFIC 224 may convert a baseband signal generated by the first communication processor 212 or the second communication processor 214 to an RF signal in a Sub6 band (e.g., about 6 GHz or less) used in the second cellular network 294 (e.g., the 5G network). For reception, a 5G Sub6 RF signal may be obtained from the second cellular network 294 (e.g., the 5G network) via an antenna (e.g., the second antenna module 244) and pre-processed in an RFFE (e.g., the second RFFE 234). The second RFIC 224 may convert the pre-processed 5G Sub6 RF signal to a baseband signal so that the baseband signal may be processed by a corresponding one between the first communication processor 212 and the second communication processor 214.

For transmission, the third RFIC 226 may convert a baseband signal generated by the second communication processor 214 to an RF signal (hereinafter, referred to as, a 5G Above6 RF signal) in a 5G Above6 band (e.g., about 6 GHz to about 60 GHz) to be used in the second cellular network 294 (e.g., the 5G network). For reception, a 5G Above6 RF signal may be obtained from the second cellular network 294 (e.g., the 5G network) via an antenna (e.g., the antenna 248) and pre-processed via the third RFFE 236. The third RFIC 226 may convert the pre-processed 5G Above6 RF signal to a baseband signal so that the baseband signal may be processed by the second communication processor 214. According to an embodiment, the third RFFE 236 may be formed as part of the third RFIC 226.

According to an embodiment, the electronic device 101 may include the fourth RFIC 228 separately from or as part of the third RFIC 226. In this case, the fourth RFIC 228 may convert a baseband signal generated by the second communication processor 214 to an RF signal in an intermediate frequency band (e.g., about 9 GHz to about 11 GHz) (hereinafter, referred to as an intermediate frequency (IF) signal), and provide the IF signal to the third RFIC 226. The third RFIC 226 may convert the IF signal to a 5G Above6

RF signal. During reception, a 5G Above6 RF signal may be received from the second cellular network 294 (e.g., the 5G network) through an antenna (e.g., the antenna 248) and converted to an IF signal by the third RFIC 226. The fourth RFIC 228 may convert the IF signal to a baseband signal so that the baseband signal may be processed by the second communication processor 214.

According to an embodiment, the first RFIC 222 and the second RFIC 224 may be implemented as at least part of a single chip or a single package. According to various embodiments of the present disclosure, if the first RFIC 222 and the second RFIC 224 are implemented as a single chip or a single package in FIG. 2A or 2B, the second RFIC 224 may be omitted. In this case, the first RFIC 222 is connected to the first RFFE 232 and the second RFFE 234, so the first RFIC 222 may convert a baseband signal into a signal of a band supported by the first RFFE 232 and/or the second RFFE 234, and transmit the converted signal to one of the first RFFE 232 and the second RFFE 234. According to an embodiment, the first RFFE 232 and the second RFFE 234 may be implemented as at least part of a single chip or a single package. According to an embodiment, at least one of the first antenna module 242 or the second antenna module 244 may be omitted or combined with the other antenna module to process RF signals in a plurality of corresponding bands.

According to an embodiment, the third RFIC 226 and the antenna 248 may be arranged on the same substrate to form a third antenna module 246. For example, the wireless communication module 192 or the processor 120 may be arranged on a first substrate (e.g., a main printed circuit board (PCB)). In this case, the third RFIC 226 may be arranged in a partial area (e.g., the bottom surface) of a second substrate (e.g., a sub PCB) other than the first substrate and the antenna 248 may be arranged in another partial area (e.g., the top surface) of the second substrate, to form the third antenna module 246. As the third RFIC 226 and the antenna 248 are arranged on the same substrate, it is possible to reduce length of a transmission line between the third RFIC 226 and the antenna 248. This may reduce, for example, loss (e.g., attenuation) of a signal in a high frequency band (e.g., about 6 GHz to about 60 GHz) used for a 5G network communication, on the transmission line. Therefore, the electronic device 101 may increase quality or a speed of a communication with the second network 294 (e.g., the 5G network).

According to an embodiment, the antenna 248 may be formed as an antenna array including a plurality of antenna elements which may be used for beamforming. In this case, for example, the third RFIC 226 may include a plurality of phase shifters 238 corresponding to the plurality of antenna elements, as part of the third RFFE 236. During transmission, each of the plurality of phase shifters 238 may change a phase of a 5G Above6 RF signal to be transmitted to the outside of the electronic device 101 (e.g., a base station in the 5G network) via a corresponding antenna element. During reception, each of the phase shifters 238 may change a phase of a 5G Above6 RF signal received from the outside via a corresponding antenna element to the same or substantially same phase. This enables transmission or reception via beamforming between the electronic device 101 and the outside.

The second cellular network 294 (e.g., the 5G network) may be operated independently of the first cellular network 292 (e.g., the legacy network) (e.g., stand-alone (SA)) or in connection to the first network 292 (e.g., the legacy network) (e.g., non-stand alone (NSA)). For example, the 5G network may include only an access network (e.g., a 5G radio access network (RAN) or next generation RAN (NG RAN)) without a core network (e.g., a next generation core (NGC)). In this case, after accessing the access network of the 5G network, the electronic device 101 may access an external network (e.g., an Internet) under the control of a core network (e.g., an evolved packet core (EPC)) of the legacy network. Protocol information for a communication with the legacy network (e.g., LTE protocol information) and protocol information for a communication with the 5G network (e.g., new radio (NR) protocol information) may be stored in the memory 230 and accessed by another component (e.g., the processor 120, the first communication processor 212, or the second communication processor 214).

Figure 3A:
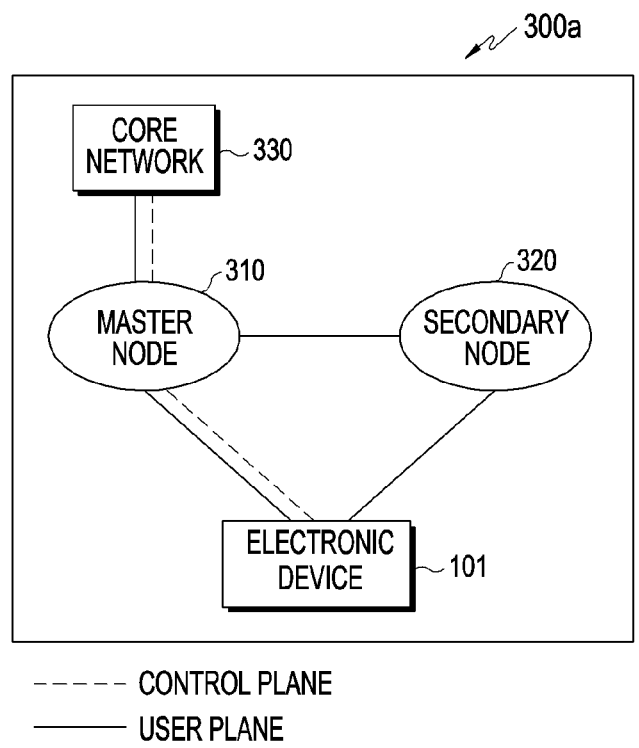
FIGS. 3A, 3B, and 3C are diagrams illustrating wireless communication systems which provide a legacy communication network and/or a 5G communication network according to various embodiments of the present disclosure.
Figure 3B:
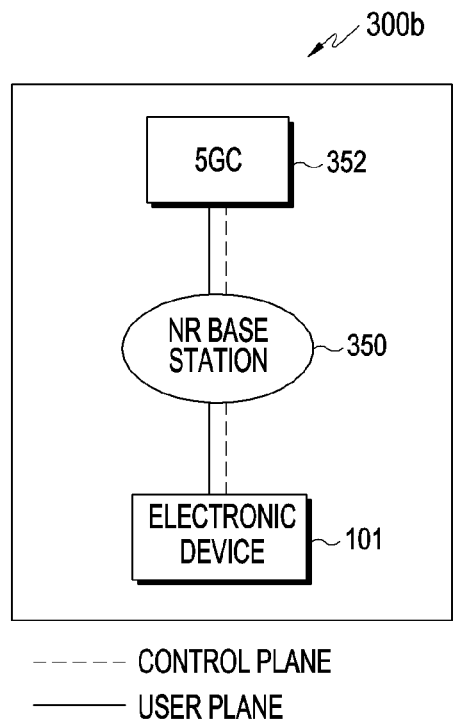
Figure 3C:
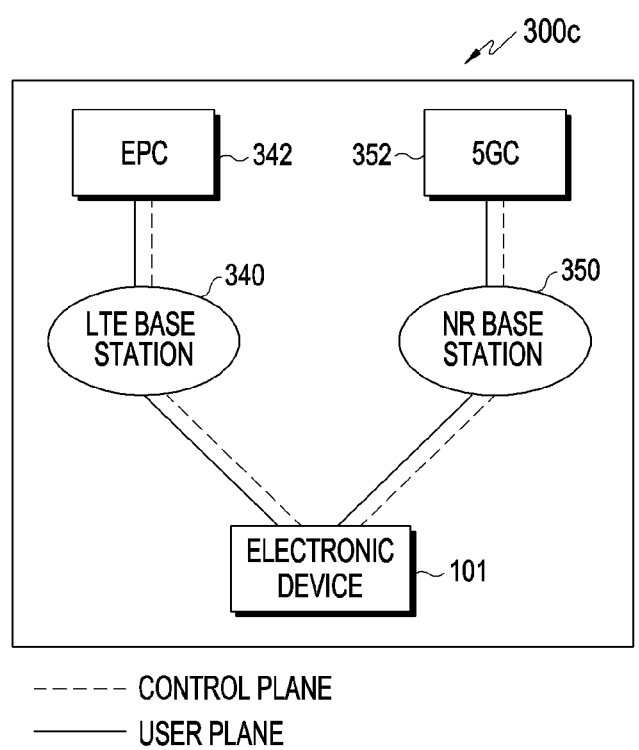

FIGS. 3A, 3B, and 3C are diagrams illustrating a wireless communication system which provides a legacy communication network and/or a 5G communication network. Referring to FIGS. 3A, 3B, and 3C, network environments 300a to 300c may include at least one of a legacy network or a 5G network. The legacy network may include, for example, a 4G or LTE base station 340 (e.g., an eNB or eNodeB) of the 3GPP standard supporting a wireless access of the electronic device 101, and an EPC 342 which manages a 4G communication. The 5G network may include, for example, an NR base station 350 (e.g., gNB or gNodeB) supporting a wireless access of the electronic device 101, and a 5th generation core (5GC) 352 which manages a 5G communication of the electronic device 101.

According to various embodiments of the present disclosure, the electronic device 101 may transmit and receive a control message and user data via a legacy communication and/or 5G communication. The control message may include a message related to at least one of, for example, security control, bearer setup, authentication, registration, or mobility management of the electronic device 101. The user data may refer to, for example, user data except for a control message transmitted and received between the electronic device 101 and a core network 330 (e.g., the EPC 342).

Referring to FIG. 3A, the electronic device 101 according to an embodiment may transmit and receive at least one of a control message or user data to and from at least part (e.g., an NR base station 350 and a 5GC 352) of the 5G network using at least part (e.g., an LTE base station 340 and an EPC 342) of the legacy network.

According to various embodiments of the present disclosure, the network environment 300a may include a network environment which provides wireless communication dual connectivity (DC) to the LTE base station 340 and the NR base station 350 and transmits and receives a control message to and from the electronic device 101 via one core network 330 of the EPC 342 or the 5GC 352.

According to various embodiments of the present disclosure, in a DC environment, one of the LTE base station 340 and the NR base station 350 may operate as a master node (MN) 310 and the other may operate as a secondary node (SN) 320. The MN 310 may be connected to the core network 330 and transmit and receive a control message to and from the core network 330. The MN 310 and the SN 320 may be connected to each other via a network interface and transmit and receive a message related to management of a wireless resource (e.g., a communication channel) to and from each other.

According to various embodiments of the present disclosure, the MN 310 may include the LTE base station 340, the SN 320 may include the NR base station 350, and the core network 330 may include the EPC 342. For example, a control message may be transmitted and received via the LTE base station 340 and the EPC 342, and user data may be transmitted via at least one of the LTE base station 340 or the NR base station 350.

According to various embodiments of the present disclosure, the MN 310 may include the NR base station 350, the SN 320 may include the LTE base station 340, and the core network 330 may include the 5GC 352. For example, a control message may be transmitted and received via the NR base station 350 and the 5GC 352, and user data may be transmitted via at least one of the LTE base station 340 or the NR base station 350.

Referring to FIG. 3B, according to various embodiments of the present disclosure, a 5G network may include an NR base station 350 and a 5GC 352, and independently transmit and receive a control message and user data to and from an electronic device 101.

Referring to FIG. 3C, according to various embodiments of the present disclosure, each of a legacy network and a 5G network may independently provide data transmission and reception. For example, an electronic device 101 may transmit and receive a control message and user data to and from an EPC 342 via an LTE base station 340. For another example, the electronic device 101 may transmit and receive a control message and user data to and from a 5GC 352 via an NR base station 350.

According to various embodiments of the present disclosure, the electronic device 101 may be registered in at least one of the EPC 342 or the 5GC 352, and transmit and receive a control message.

According to various embodiments of the present disclosure, the EPC 342 and the 5GC 352 may interwork and manage a communication of the electronic device 101. For example, mobility information of the electronic device 101 may be transmitted and received via an interface between the EPC 342 and the 5GC 352.

As described above, dual connectivity via the LTE base station 340 and the NR base station 350 may be referred to as E-UTRA new radio dual connectivity (EN-DC).

Figure 4:
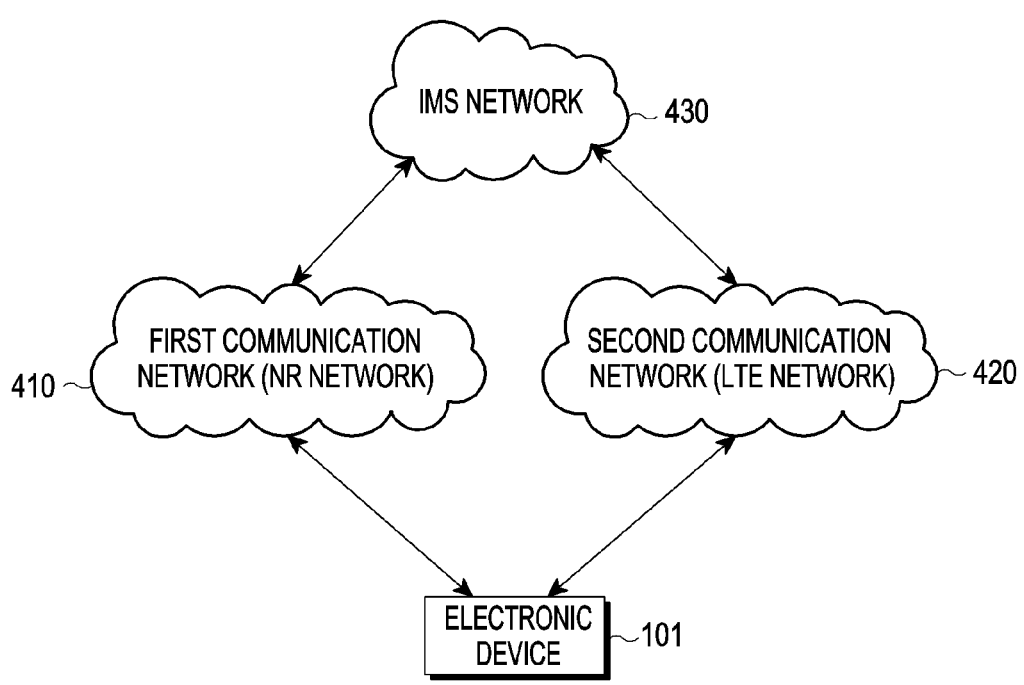
FIG. 4 illustrates a communication system including an IMS network according to various embodiments of the present disclosure.

FIG. 4 illustrates a communication system including an IMS network according to various embodiments of the present disclosure. Referring to FIG. 4, an electronic device 101 may concurrently access a first communication network 410 (e.g., a 5G communication network) or a second communication network 420 (e.g., a 4G LTE communication network), or access separately the first communication network 410 or the second communication network 420. Hereinafter, the term 5G communication network may be interchangeably used with the terms NR network, and NR communication network, and the term 4G LTE communication network may be interchangeably used with the LTE network, and LTE communication network. In addition, the electronic device 101 may access an IMS network 430 via the first communication network 410 or may access the IMS network 430 via the second communication network 420.

According to various embodiments of the present disclosure, the electronic device 101 may provide a communication service (e.g., a voice call or a voice call service) with another electronic device. According to an embodiment, a communication system may include a plurality of access networks (e.g., the first communication network 410 or the second communication network 420) provided by a plurality of communication service providers.

According to an embodiment, the electronic device 101 may modulate or demodulate a signal for communicating with at least one communication network (e.g., the first communication network 410) via a communication module 190. For example, the electronic device 101 may be connected to at least one telecommunication network (e.g., a communication network) via a wireless or wired communication to communicate with another electronic device. The electronic device 101 may control a communication with at least one communication network or at least one IP service network. According to an embodiment, the electronic device 101 may include hardware including at least one processor and software for controlling the hardware. The electronic device 101 may receive a communication service via the first communication network 410 and the second communication network 420 or the IMS network 430.

According to an embodiment, the first communication network 410 and the second communication network 420 may include a communication network operated by a communication service provider.

For example, the first communication network 410 and the second communication network 420 may include a new radio (NR) network, a long term evolution (LTE) network, a mobile world interoperability for microwave access (WiMax) network, and/or the like. Alternatively, the first communication network 410 and the second communication network 420 may include a code division multiple access (CDMA) 1x network, a wideband code division multiple access (WCDMA) network, or a global system for mobile communications (GSM) network. For example, the first communication network 410 and the second communication network 420 may provide the electronic device 101 or another electronic device with a communication service via a wired or wireless interface. According to an embodiment, the first communication network 410 and the second communication network 420 may be heterogeneous communication networks which use different types of protocols and which are operated by the same communication service provider. For example, the first communication network 410 may be an NR communication network operated by a specific communication service provider, and the second communication network 420 may be an LTE communication network operated by the specific communication service provider. According to another embodiment, the first communication network 410 and the second communication network 420 may be communication networks which use different types of protocols and which are operated by different communication service providers, respectively. For example, the first communication network 410 may be an NR communication network operated by a first communication service provider, and the second communication network 420 may be an LTE communication network operated by a second communication service provider.

According to an embodiment, the IMS network 430 may include an IP-based service network operated by a communication service provider (or a service provider). The IMS network 430 may provide the electronic device 101 and another electronic device with an IP-based communication service (e.g., a multimedia service). For example, the IMS network 430 may include an IMS network operated by a communication service provider. According to one embodiment, the IMS network 430 may include an IP service network operated by another service provider related to the communication service provider of the IMS network (e.g., another service provider which has made an agreement with the communication service provider of the IMS network).

According to an embodiment, the electronic device 101 may access (e.g., attach) a plurality of communication networks operated by different communication service providers or register the electronic device 101 with a plurality of communication networks. The electronic device 101 may obtain a plurality of subscriber information which correspond to a plurality of communication networks, respectively. For example, the electronic device 101 may obtain a plurality of subscriber identification module (SIM) information by using a plurality of SIM card slots. For example, the electronic device 101 may include a first SIM card which corresponds to a first communication service provider and a second SIM card which corresponds to a second communication service provider. The communication module 190 of the electronic device 101 may access the first communication network 410 of the first communication service provider based on information of the first SIM card (or first subscriber information). Alternatively, the communication module 190 may access the second communication network 420 of the second communication service provider based on information of the second SIM card (or second subscriber information).

According to an embodiment, if the electronic device 101 supports a plurality of wireless connections, the electronic device 101 may access the first communication network 410 and the second communication network 420 simultaneously. Alternatively, if it is impossible for the electronic device 101 to support the plurality of wireless connections simultaneously, the electronic device 101 may access one of the first communication network 410 or the second communication network 420. According to an embodiment, even though the electronic device 101 includes a plurality of subscriber information and supports a plurality of wireless connections, if only the first communication network 410 of the first communication service provider provides a service at an area where the electronic device 101 is located, the communication module 190 may access the first communication network 410 and receive a communication service. According to an embodiment, each of the plurality of subscriber information may include, for example, a plurality of identification information of different types used in heterogeneous communication networks of the same operator. Each of the plurality of subscriber information may include, for example, one of international mobile subscriber identity (IMSI) which is identification information corresponding to an LTE network of a specific communication service provider, or public user identity (PUI) which is identification information corresponding to an IMS network of the specific communication service provider, or a combination thereof. In addition, the plurality of subscriber information may be stored in one SIM card, an internal storage space (e.g., a memory) of the electronic device 101, or another electronic device (e.g., a server) which may be connected to the electronic device 101.

According to an embodiment, the electronic device 101 may obtain the plurality of subscriber information from an internal storage space or the external, and register subscriber information which corresponds to each IP service network (e.g., the IMS network 430). For example, if the electronic device 101 supports a plurality of wireless connections simultaneously, the communication module 190 may obtain (or be assigned) a first address (e.g., an IP address) via the first communication network 410, and may register with the IMS network 430 based on the first address. According to another embodiment, if the electronic device 101 supports only one wireless connection, the communication module 190 may obtain (or be assigned) an address via one of the first communication network 410 or the second communication network 420, and may register with the IMS network 430 based on the address. According to an embodiment, even though the electronic device 101 supports the plurality of wireless connections, if only the first communication network 410 of the first communication service provider provides a service at an area where the electronic device 101 is located, the communication module 190 may obtain an address via the first communication network 410, and may register with the IMS network 430 based on the address. Additional information related to an operation for the electronic device 101 to access a communication network and an IP service network or to register with the communication network and the IP service network will be described below with reference to FIG. 5.

According to an embodiment, the second communication network 420 may include entities such as an evolved node B (eNB), a mobility management entity (MME), a gateway, and/or the like. The eNB may be a device (e.g., a base station) which provides a wireless interface (or a wireless connection) between at least one user device and an LTE network. For example, the eNB may control a wireless connection of the electronic device 101 and a radio resource (e.g., a frequency) allocated to the wireless connection. The MME may manage a connection for at least one electronic device 101 which is connected to the MME via the eNB. For example, the MME may provide authentication for the electronic device 101 if the electronic device 101 accesses the LTE communication network, or may track or manage mobility of the electronic device 101 and provide a communication service. The gateway may include a serving gateway (S-GW) and a public data network gateway (PGW). For example, the gateway may route packets which are transmitted between the LTE communication network and an external communication network (e.g., an internet or the IMS network 430), provide a firewall, or allocate an address (e.g., an IP address) to at least one user device. According to some embodiments, one or more of entities, for example, the eNB, the MME, or the gateway included in the LTE communication network may be plural.

According to an embodiment, the IMS network 430 may include entities such as a call session control function (CSCF), an application server (AS), and/or the like. For example, the IMS network 430 is an IP service network operated by the first communication service provider and may provide a subscriber with an IP-based multimedia service. The CSCF may include, for example, at least one of a proxy call session control function (P-CSCF), a serving call session control function (S-CSCF), or an interrogating call session control function (I-CSCF). For example, the CSCF may register the electronic device 101 with the IMS network 430 in response to a registration request from the electronic device 101. In addition, the CSCF may provide a function related to a call connection of the IMS network 430. The AS is a device for supporting a service provided via the IMS network 430, and may include, for example, a telephony application server (TAS) or a voice call continuity (VCC) server. The TAS may provide at least one electronic device 101 with a multimedia supplementary service (e.g., caller ID display, a call ring tone, and/or the like). The VCC server may provide at least one user device with a seamless handover between heterogeneous networks (e.g., a CDMA network and an IMS network).

According to an embodiment, the electronic device 101 may access the first communication network 410 or the second communication network 420. For example, the electronic device 101 may request an access (e.g., attach) from the first communication network 410 or the second communication network 420 via a wireless connection to a gNB or an eNB. In response to the access request (or a registration request) of the electronic device 101, an MME may perform an authentication procedure associated with the electronic device 101, and transmit, to a gateway, a registration request (e.g., a create session request) associated with the electronic device 101. The gateway may allocate at least one address (e.g., an IP address) to the electronic device 101 in response to the registration request. For example, the second communication network 420 may provide a connection between the electronic device 101 and an external communication network (e.g., an internet or the IMS network 430) based on the at least one address assigned to the electronic device 101.

According to an embodiment, the electronic device 101 may register the electronic device 101 in the IMS network 430 via the first communication network 410 or the second communication network 420. For example, the electronic device 101 may transmit a registration request (e.g., attach) to the second communication network 420 (e.g., a P-GW) which corresponds to first subscriber information. The second communication network 420 may allocate at least one address (e.g., an IP address) to the electronic device 101 in response to the registration request. The electronic device 101 may transmit a registration request (e.g., a session initiation protocol (SIP) register) to the IMS network 430 by using the at least one address. According to an embodiment, the second communication network 420 and the IMS network 430 may be operated by different communication service providers, respectively.

According to various embodiments of the present disclosure, the electronic device 101 may obtain at least one address information (e.g., an IP address or an identifier for the electronic device 101) from the communication networks, and transmit, to the IMS network 430, a registration request (e.g., a SIP register) for the IMS network 430 including the least one address information via the communication networks. For example, in response to the registration request, the IMS network 430 may register the electronic device 101 with the IMS network 430 and provide a service.

An electronic device according to one of various embodiments of the present disclosure may include at least one antenna module; and at least one processor configured to receive a communication service from a first communication network, a second communication network, and an IP multimedia subsystem (IMS) network via the at least one antenna module, wherein the at least one processor may be configured to: access the first communication network based on first identification information which corresponds to the first communication network, via the accessed first communication network, based on second identification information which corresponds to the IMS network, request the IMS network to register the electronic device, if registration request to the IMS network fails, access the second communication network, and request the IMS network to register the electronic device via the second communication network.

According to various embodiments of the present disclosure, the first communication network may be a 5G communication network.

According to various embodiments of the present disclosure, the second communication network may be a long term evolution (LTE) communication network.

According to various embodiments of the present disclosure, the at least one processor may be further configured to: in response to the registration request to the IMS network, receive a response from the IMS network, and after completion of registration with the IMS network via the second communication network, re-access the first communication network.

According to various embodiments of the present disclosure, the at least one processor may be configured to: obtain at least one address information from the first communication network, and transmit, to the IMS network, the registration request to the IMS network via the first communication network, the registration request including the at least one address information.

According to various embodiments of the present disclosure, the at least one processor may be configured to: obtain address information which corresponds to the IMS network from an external server or a subscriber identification module which is functionally connected to the electronic device, and transmit, to the first communication network, the registration request to the IMS network via the first communication network, the registration request including the at least one address information.

According to various embodiments of the present disclosure, the at least one processor may be further configured to: if the registration request to the IMS network is successful, provide a service of the IMS network via the first communication network.

According to various embodiments of the present disclosure, the at least one processor may be further configured to: if the registration request to the IMS network via the second communication network fails, operate based on a circuit switched fall back (CSFB).

According to various embodiments of the present disclosure, the at least one processor may be further configured to: identify whether a preset IMS registration timer expires, and if the preset IMS registration timer expires, call back to the second communication network and re-register with the IMS network.

According to various embodiments of the present disclosure, the at least one processor may be further configured to: after completion of re-registration with the IMS network via the second communication network, re-access the first communication network.

Figure 5:
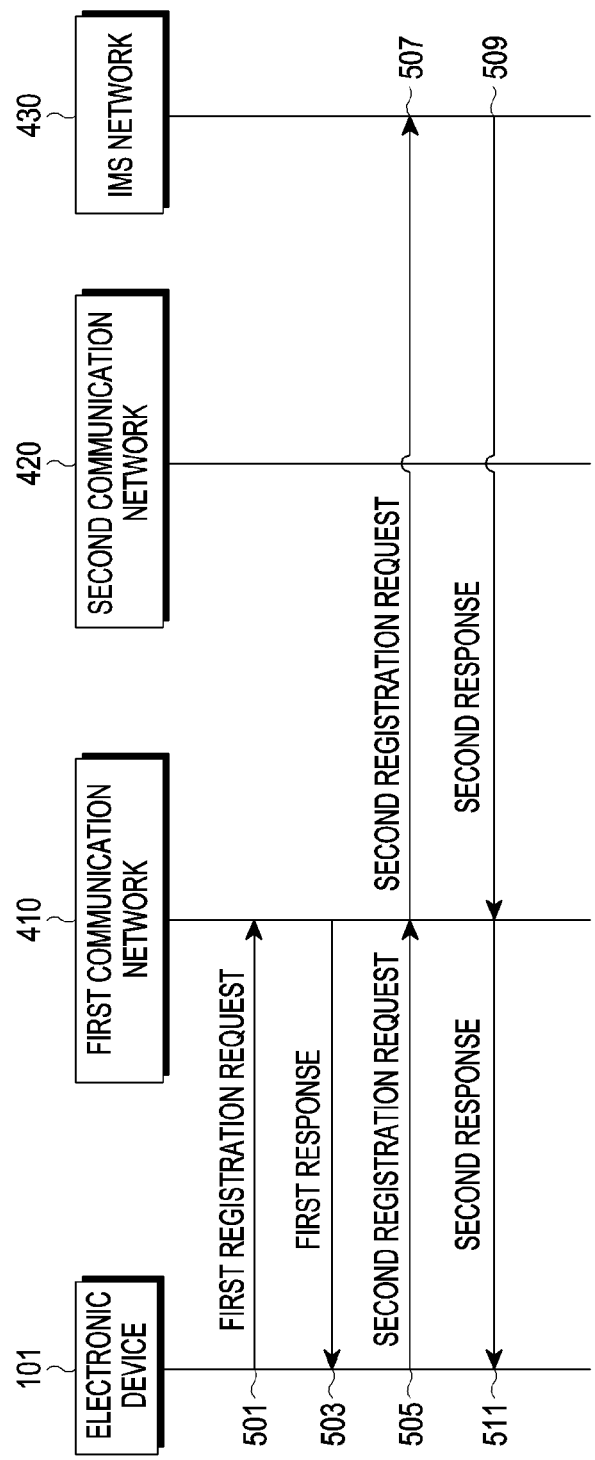
FIG. 5 is a flowchart illustrating an IMS network registration procedure according to various embodiments of the present disclosure.

FIG. 5 is a flowchart illustrating an IMS network registration procedure according to various embodiments of the present disclosure.

Referring to FIG. 5, according to an embodiment, in operation 501, an electronic device 101 may register with an IMS network 430 via a first communication network 410.

In operation 501, the electronic device 101 may transmit a first registration request (e.g., an attach request) including first information of a first subscriber (or a first user) (e.g., first identification information) to the first communication network 410. The first communication network 410 may register the electronic device 101 with the first communication network 410 based on the first information of the first subscriber (e.g., the first identification information) included in the first registration request. According to an embodiment, the first communication network 410 may be a communication network (e.g., an NR communication network) operated by a communication service provider which corresponds to the first information of the first subscriber. For example, if the electronic device 101 is a subscriber of the communication service provider or a subscriber of another communication service provider which has made an agreement with the communication service provider, the first communication network 410 may register the electronic device 101 with the first communication network 410 and provide the electronic device 101 with a communication service. In operation 503, the first communication network 410 may transmit a first response to the first registration request to the electronic device 101. The first response may include address information (e.g., an IP address) allocated to the electronic device 101 by the first communication network 410. In addition, the first response may include address information which corresponds to the IMS network 430.

In operation 505 and operation 507, the electronic device 101 may transmit a second registration request (e.g., a SIP register) based on second information of the first subscriber (or the first user) (e.g., second identification information) to the IMS network 430. According to an embodiment, the electronic device 101 may receive a protocol configuration option (PCO) from the first communication network 410. The electronic device 101 may obtain address information (e.g., an IP address) which corresponds to the IMS network 430 based on the PCO. The electronic device 101 may transmit a second registration request to the first communication network 410 based on the address information. The first communication network 410 may transmit the second registration request received from the electronic device 101 to the IMS network 430 based on the address information, for example, via a gateway of the first communication network 410. In operation 509 and operation 511, the IMS network 430 may register the electronic device 101 with the IMS network 430 based on the second registration request, and transmit a second response (e.g., OK) to the second registration request to the electronic device 101.

In this way, the electronic device 101 may use the IMS network 430 via the first communication network 410. For example, the electronic device 101 may receive a voice over new radio (VoNR) service by registering with an IMS network via an NR communication network.

Figure 6:
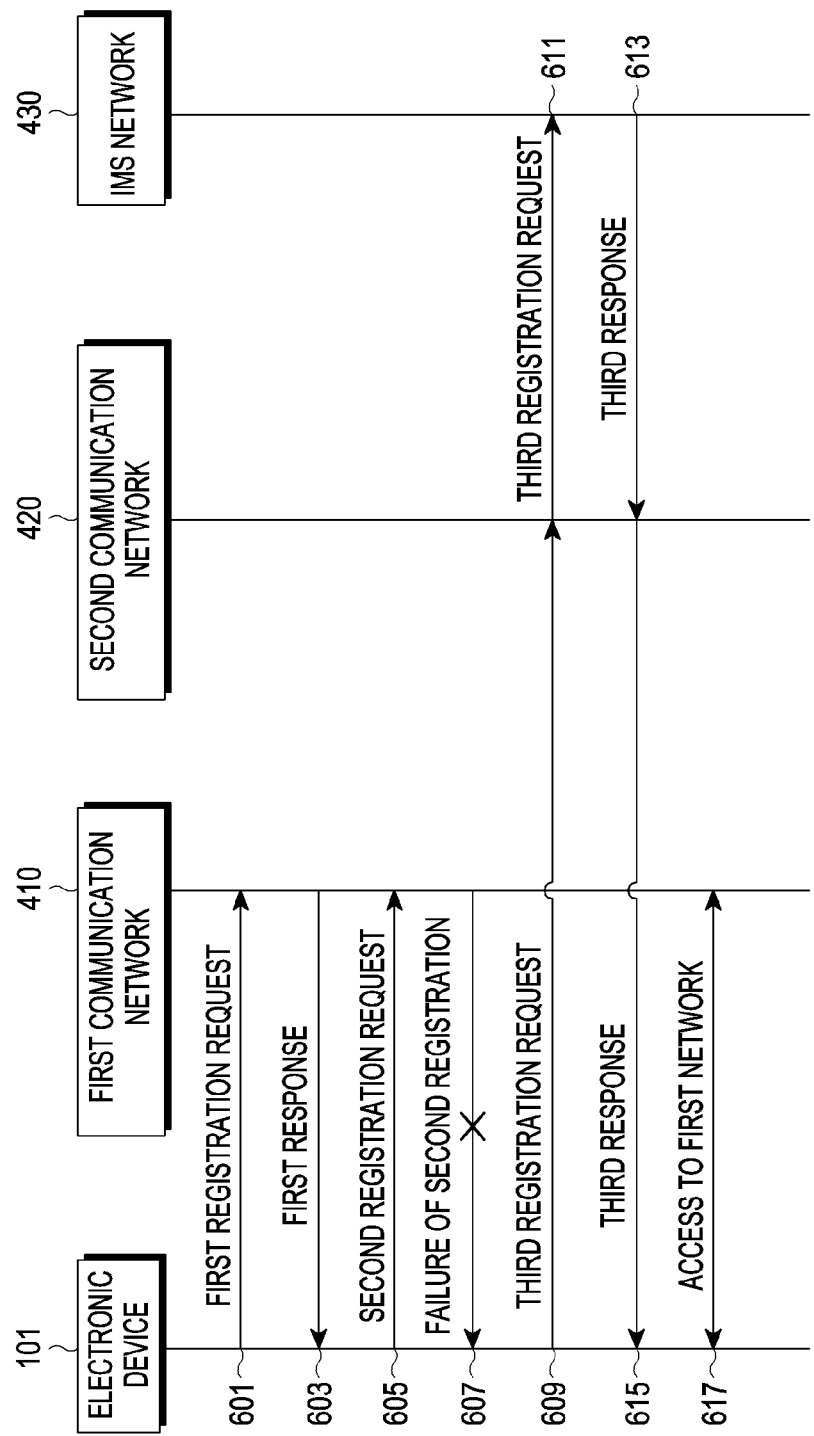
FIG. 6 is a flowchart illustrating an IMS network registration procedure according to various embodiments of the present disclosure.

FIG. 6 is a flowchart illustrating an IMS network registration procedure according to various embodiments of the present disclosure.

Referring to FIG. 6, according to an embodiment, in operation 601, an electronic device 101 may register with an IMS network 430 via a first communication network 410.

In operation 601, the electronic device 101 may transmit a first registration request (e.g., an attach request) including first information of a first subscriber (or a first user) information (e.g., first identification information) to the first communication network 410. The first communication network 410 may register the electronic device 101 with the first communication network 410 based on the first information of the first subscriber (e.g., the first identification information) included in the first registration request. According to an embodiment, the first communication network 410 may be a communication network (e.g., an NR communication network) operated by a communication service provider which corresponds to the first information of the first subscriber. For example, if the electronic device 101 is a subscriber of the communication service provider or a subscriber of another communication service provider which has made an agreement with the communication service provider, the first communication network 410 may register the electronic device 101 with the first communication network 410 and provide the electronic device 101 with a communication service. In operation 603, the first communication network 410 may transmit a first response to the first registration request to the electronic device 101. The first response may include address information (e.g., an IP address) allocated to the electronic device 101 by the first communication network 410. In addition, the first response may include address information which corresponds to the IMS network 430.

In operation 605, the electronic device 101 may request registration to the IMS network 430 via the first communication network 410. If the registration fails, in operation 607, the electronic device 101 may not perform IMS registration (e.g., VoNR) via the first communication network 410.

A case in which the registration via the first communication network 410 fails is as follows. For example, if PDU session establishment for an IMS data network name (DNN) is rejected, the IMS registration via the first communication network 410 may fail. According to another embodiment, even though the PDU session establishment for the IMS DNN is accepted, however an IMS registration procedure via an SIP signal fails, the IMS registration via the first communication network 410 may fail.

According to various embodiments of the present disclosure, if the registration request to the IMS network 430 via the first communication network 410 fails, the electronic device 101 may call back to the second communication network 420 and attempt to register with the IMS network 430. For example, the electronic device 101 may access the second communication network 420 (e.g., an LTE communication network) and attempt to register with the IMS network 430.

That is, in operation 609 and operation 611, the electronic device 101 may transmit a third registration request (e.g., a SIP register) based on second information of the first subscriber (or the first user) (e.g., second identification information) to the IMS network 430. According to an embodiment, the electronic device 101 may receive a protocol configuration option (PCO) from the second communication network 420. The electronic device 101 may obtain address information (e.g., an IP address) which corresponds to the IMS network 430 based on the PCO. The electronic device 101 may transmit a third registration request to the second communication network 420 based on the address information. The second communication network 420 may transmit the third registration request received from the electronic device 101 to the IMS network 430 based on the address information, for example, via a gateway of the second communication network 420. In operation 613 and operation 615, the IMS network 430 may register the electronic device 101 with the IMS network 430 based on the third registration request, and transmit a third response (e.g., OK) to the third registration request to the electronic device 101.

In this way, the electronic device 101 may use the IMS network 430 via the second communication network 420. For example, the electronic device 101 may receive a VoLTE service by registering with an IMS network via an LTE communication network.

Figure 7:
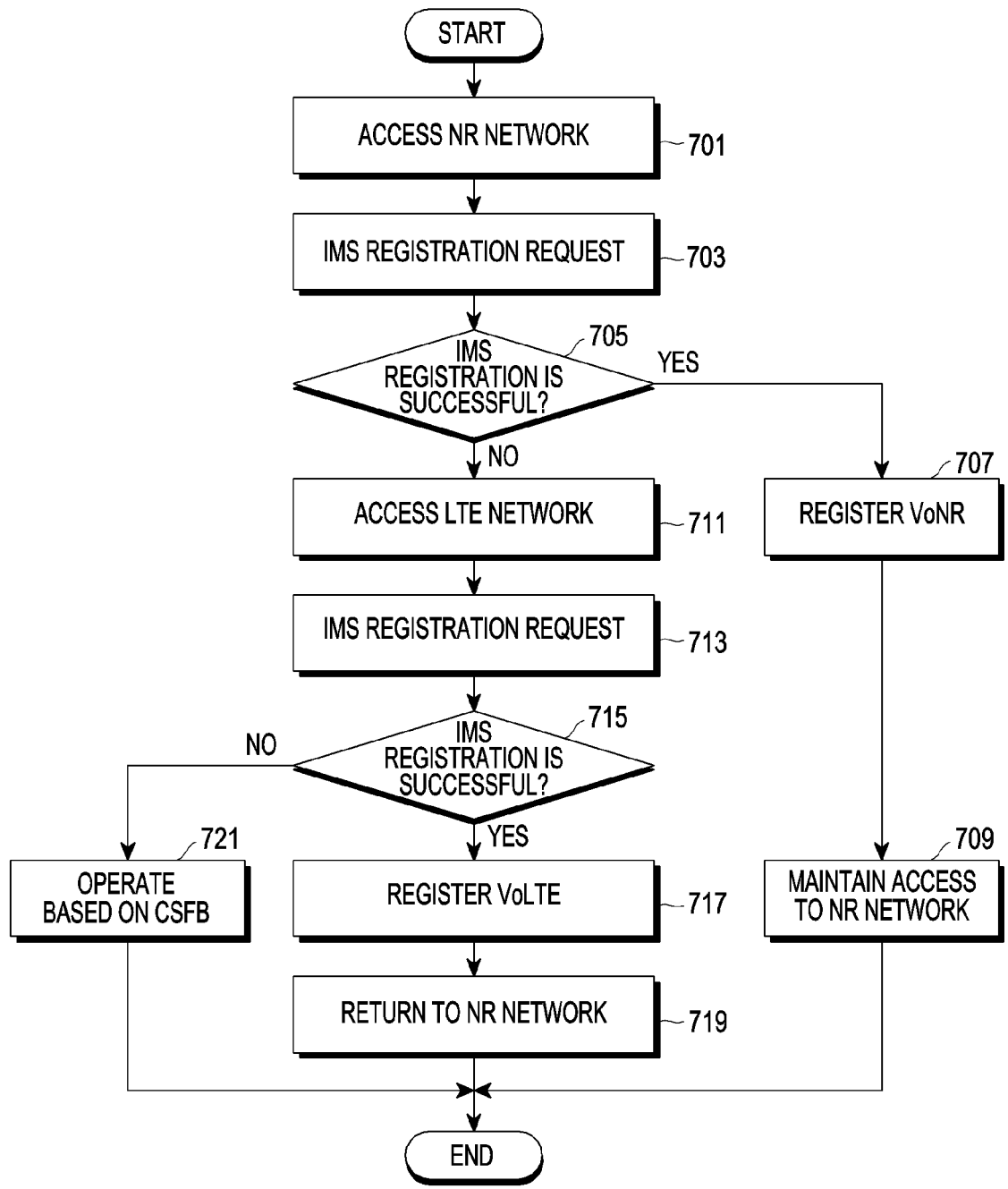
FIG. 7 is a flowchart illustrating an IMS network registration procedure according to various embodiments of the present disclosure.

FIG. 7 is a flowchart illustrating an IMS network registration procedure according to various embodiments of the present disclosure. Referring to FIG. 7, an electronic device 101 may access an NR communication network in operation 701. In operation 703, the electronic device 101 may request IMS registration via the NR communication network. As described above in FIG. 5, if the IMS registration via the NR communication network is successful in operation 705, the electronic device 101 may register VoNR in operation 707. In operation 709, the electronic device 101 may use a call connection service via the VoNR while maintaining a connection with the NR communication network.

As described above in FIG. 6, if the IMS registration via the NR communication network fails in operation 705, the electronic device 101 may call back and access an LTE communication network in operation 711.

The electronic device 101 may request IMS registration via the LTE communication network in operation 713. If the IMS registration via the LTE communication network is successful in operation 715, the electronic device 101 may register VoLTE in operation 717. According to various embodiments of the present disclosure, if the IMS registration via the LTE communication network fails in operation 715, the electronic device 101 may operate based on a circuit switched fallback (CSFB) in operation 721. At this time, a radio access technology (RAT) of the electronic device 101 may maintain the LTE communication network. For example, if a call connection is attempted while the electronic device 101 maintains the LTE communication network, the electronic device 101 may fall back to a circuit switched (CS) RAT of 3G or 2G and perform a call service because the IMS registration via the LTE communication network fails in operation 715.

According to various embodiments of the present disclosure, after registering the VoLTE via the LTE communication network, the electronic device 101 may return to the NR communication network in operation 719. After returning to the NR communication network, the electronic device 101 may receive a data communication service via the NR communication network.

According to various embodiments of the present disclosure, in a state that the electronic device 101 registers the VoLTE, the electronic device 101 may perform a call service via a pre-registered IMS network (e.g., the VoLTE) if a call connection is attempted while the electronic device 101 accesses and communicates with the NR communication network.

According to various embodiments of the present disclosure, if the call service via the VoLTE is terminated, the electronic device 101 may return to the NR communication network to receive a data communication service.

According to various embodiments of the present disclosure, in a state that the electronic device 101 registers the VoLTE, the electronic device 101 may perform a call service via the pre-registered IMS network (e.g., the VoLTE) upon receiving a call connection from another electronic device while the electronic device 101 accesses and communicates with the NR communication network. For example, if the call connection is requested from the other electronic device, the IMS network may identify that the electronic device 101 is registered with the NR communication network via terminating access domain selection (T-ADS), and request the call connection from the electronic device 101 via the NR communication network. At this time, the electronic device 101 may be connected to the IMS network via the NR communication network to which the electronic device 101 is currently connected for the call connection with the other electronic device by using the pre-registered IMS network, or be connected to the IMS network by falling back to the LTE communication network after releasing the access to the NR communication network.

Figure 8:
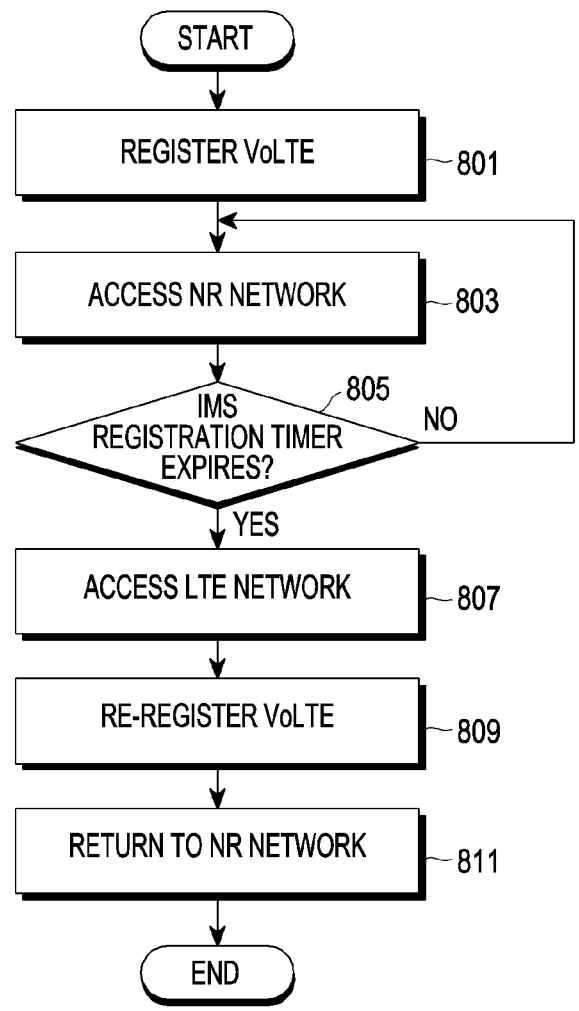
FIG. 8 is a flowchart illustrating an IMS network registration procedure according to various embodiments of the present disclosure.

FIG. 8 is a flowchart illustrating an IMS network registration procedure according to various embodiments of the present disclosure. Referring to FIG. 8, according to various embodiments of the present disclosure, in a state that an electronic device 101 registers the VoLTE in operation 801, an electronic device 101 may access and communicate with an NR communication network in operation 803.

According to various embodiments of the present disclosure, the electronic device 101 may identify whether a preset IMS registration timer expires in operation 805. If the preset IMS registration timer expires, the electronic device 101 may call back and access an LTE communication network in operation 807.

According to various embodiments of the present disclosure, the electronic device 101 may request IMS registration via the LTE communication network in operation 809. If the IMS registration via the LTE communication network is successful, the VoLTE may be re-registered.

According to various embodiments of the present disclosure, after re-registering the VoLTE via the LTE communication network, the electronic device 101 may return to the NR communication network in operation 811. After returning to the NR communication network, the electronic device 101 may receive a data communication service via the NR communication network.

A method to maintain a call function in an electronic device according to one of various embodiments of the present disclosure may include accessing a first communication network based on first identification information which corresponds to the first communication network; via the accessed first communication network, based on second identification information which corresponds to an IP multimedia subsystem (IMS) network, requesting the IMS network to register the electronic device; if registration request to the IMS network fails, accessing a second communication network; and requesting the IMS network to register the electronic device via the second communication network.

According to various embodiments of the present disclosure, the first communication network may be a 5G communication network.

According to various embodiments of the present disclosure, the second communication network may be a long term evolution (LTE) communication network.

According to various embodiments of the present disclosure, the method may further include receiving a response from the IMS network in response to the registration request to the IMS network; and re-accessing the first communication network after completion of registration with the IMS network via the second communication network.

According to various embodiments of the present disclosure, the method may further include obtaining at least one address information from the first communication network; and transmitting, to the IMS network, the registration request to the IMS network via the first communication network, the registration request including the at least one address information.

According to various embodiments of the present disclosure, the method may further include obtaining address information which corresponds to the IMS network from an external server or a subscriber identification module which is functionally connected to the electronic device; and transmitting, to the first communication network, the registration request to the IMS network via the first communication network, the registration request including the at least one address information.

According to various embodiments of the present disclosure, the method may further include providing a service of the IMS network via the first communication network if the registration request to the IMS network is successful.

According to various embodiments of the present disclosure, the method may further include operating based on a circuit switched fall back (CSFB) if the registration request to the IMS network via the second communication network fails.

According to various embodiments of the present disclosure, the method may further include identifying whether a preset IMS registration timer expires; and calling back to the second communication network and re-register with the IMS network if the preset IMS registration timer expires.

According to various embodiments of the present disclosure, the method may further include re-accessing the first communication network after completion of re-registration with the IMS network via the second communication network.

According to various embodiments of the present disclosure, even though a 5G communication network does not support an IMS voice call service (VoLTE) when a voice call function is used in an electronic device, the electronic device calls back to a 4G LTE communication network and uses the IMS voice call service, thereby the electronic device may use the voice call function without delay.

The electronic device according to various embodiments may be one of various types of electronic devices. The electronic devices may include, for example, a computer device, a portable communication device (e.g., a smartphone), a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a task performing device). For example, a processor of the machine (e.g., the master device or the task performing device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device, comprising:
at least one antenna; and
at least one processor configured to receive a communication service from a first communication network, a second communication network, and an internet protocol (IP) multimedia subsystem (IMS) network via the at least one antenna,
wherein the at least one processor is further configured to:
access the first communication network;
via the accessed first communication network, request the IMS network for an IMS voice call service to register the electronic device;
in response to a registration request to the IMS networker via the first communication network failing, request the IMS network for the IMS voice call service to register the electronic device via the second communication network;
in response to a registration request to the IMS network via the second communication network succeeding, register information associated with the IMS network; and in response to a call connection attempt while the electronic device accesses the first communication network, perform a call service via the IMS network by falling back to the second communication network, based on the information associated with the IMS network.

2. The electronic device of claim 1, wherein the first communication network is a 5$^{th}$ generation (5G) communication network.

3. The electronic device of claim 1, wherein the second communication network is a long term evolution (LTE) communication network.

4. The electronic device of claim 1, wherein the at least one processor is further configured to:
in response to the registration request to the IMS network, receive a response from the IMS network, and
after completion of registration with the IMS network via the second communication network, re-access the first communication network.

5. The electronic device of claim 1, wherein the at least one processor is configured to:
obtain at least one address information from the first communication network, and
transmit, to the IMS network via the first communication network, the registration request including the at least one address information.

6. The electronic device of claim 1, wherein the at least one processor is configured to:
obtain address information that corresponds to the IMS network from an external server or a subscriber identification module (SIM) that is functionally connected to the electronic device, and
transmit, to the IMS network via the first communication network, the registration request including the address information.

7. The electronic device of claim 1, wherein the at least one processor is further configured to:
if the registration request to the IMS network succeeds, provide a service of the IMS network via the first communication network.

8. The electronic device of claim 1, wherein the at least one processor is further configured to:
if the registration request to the IMS network, via the second communication network, fails, enable an operation based on a circuit switched fall back (CSFB).

9. The electronic device of claim 1, wherein the at least one processor is further configured to:
determine whether a preset IMS registration timer expires, and
if the preset IMS registration timer expires, call back to the second communication network and re-register with the IMS network.

10. The electronic device of claim 9, wherein the at least one processor is further configured to:
after completion of re-registration with the IMS network via the second communication network, re-access the first communication network.

11. The electronic device of claim 1, wherein the at least one processor is configured to:
identify whether a protocol data unit (PDU) session establishment for an IMS data network name (DNN) is rejected, and
when the PDU session establishment for the IMS DNN is rejected, process the registration request to the IMS network via the first communication network as a failure.

12. The electronic device of claim 11, wherein the at least one processor is configured to:
when the PDU session establishment for the IMS DNN is accepted, identify whether an IMS registration procedure via an SIP signal fails, and
when the IMS registration procedure via the SIP signal fails, process the registration request to the IMS network via the first communication network as a failure.

13. A method of an electronic device to maintain a call function, the method comprising:
accessing a first communication network;
via the accessed first communication network, requesting an IP multimedia subsystem (IMS) network for an IMS voice call service to register the electronic device;
in response to a registration request to the IMS network via the first communication network failing, requesting the IMS network for the IMS voice call service to register the electronic device via a second communication network;
in response to a registration request to the IMS network via the second communication network succeeding, registering information associated with the IMS network; and
in response to a call connection attempt while the electronic device accesses the first communication network, performing a call service via the IMS network by falling back to the second communication network, based on the information associated with the IMS network.

14. The method of claim 13, wherein the first communication network is a 5$^{th}$ generation (5G) communication network.

15. The method of claim 13, wherein the second communication network is a long term evolution (LTE) communication network.

16. The method of claim 13, further comprising:
in response to the registration request to the IMS network, receiving a response from the IMS network; and
after completion of registration with the IMS network via the second communication network, re-accessing the first communication network.

17. The method of claim 13, further comprising:
obtaining at least one address information from the first communication network; and
transmitting, to the IMS network via the first communication network, the registration request including the at least one address information.

18. The method of claim 13, further comprising:
obtaining address information that corresponds to the IMS network from an external server or a subscriber identification module (SIM) that is functionally connected to the electronic device; and
transmitting, to the IMS network via the first communication network, the registration request including the address information.

19. The method of claim 13, further comprising:
if the registration request to the IMS network succeeds, providing a service of the IMS network via the first communication network.

20. The method of claim 13, further comprising:
if the registration request to the IMS network, via the second communication network, fails, enable an operation based on a circuit switched fall back (CSFB).

21. The method of claim 13, further comprising:
determining whether a preset IMS registration timer expires; and if the preset IMS registration timer expires, calling back to the second communication network and re-register with the IMS network.

22. The method of claim 21, further comprising:

after completion of re-registration with the IMS network via the second communication network, re-accessing the first communication network.

\* \* \* \* \*